United States Patent

Glyptis

[15] 3,651,306
[45] Mar. 21, 1972

[54] ELECTRIC SOLDERING GUN AND TIP THEREFOR

[72] Inventor: Nicholas D. Glyptis, 16 West 148 Timber View Drive, Elmhurst, Ill. 60126

[22] Filed: Apr. 28, 1969

[21] Appl. No.: 819,922

[52] U.S. Cl................................219/233, 29/182.1, 75/212, 219/229, 219/236, 228/35, 228/53, 228/55
[51] Int. Cl..........................................H05b 3/12, B23k 3/04
[58] Field of Search..........219/221, 227, 229, 228, 230–239, 219/231, 381; 228/51–55, 35; 75/212; 29/182.1; 222/146 HE

[56] References Cited

UNITED STATES PATENTS

| | | | |
|---|---|---|---|
| 2,401,797 | 6/1946 | Rasmussen | 219/381 UX |
| 3,032,635 | 5/1962 | Kraft | 219/381 UX |
| 236,972 | 1/1881 | Ball | 219/233 X |
| 399,387 | 3/1889 | Dolan | 219/230 UX |
| 1,760,519 | 5/1930 | Palmer | 228/55 X |
| 1,986,197 | 1/1935 | Harshaw | 75/212 |
| 2,192,792 | 3/1940 | Kurtz | 29/182.1 |
| 2,273,589 | 2/1942 | Olt | 75/212 X |
| 2,931,881 | 4/1960 | Larson | 219/235 X |
| 3,434,455 | 3/1969 | Maytone | 228/35 X |
| 3,439,857 | 4/1969 | Bennett | 228/54 |

FOREIGN PATENTS OR APPLICATIONS

| | | | |
|---|---|---|---|
| 686,477 | 5/1964 | Canada | 228/54 |
| 531,112 | 12/1940 | Great Britain | 219/381 |

*Primary Examiner*—A. Bartis
*Attorney*—Hofgren, Wegner, Allen, Stellman & McCord

[57] ABSTRACT

A porous metal element, e.g., porous bronze, such as a mass of sintered tin-coated copper spheres, filled with a solder base material, is used as an element in a soldering device for delivering solder to the place where needed. The porous material is usually about 40–50 percent by volume, or more, interconnected voids and the voids are preferably completely filled with the solder base material to the exclusion of air. The soldering element is maintained filled with solder by surface tension while the solder is in molten condition during use of the device. The soldering element may be in the form of a tip on a soldering gun or soldering iron, or in the form of a stamping plate for stamping printed circuits or any other convenient form.

3 Claims, 5 Drawing Figures

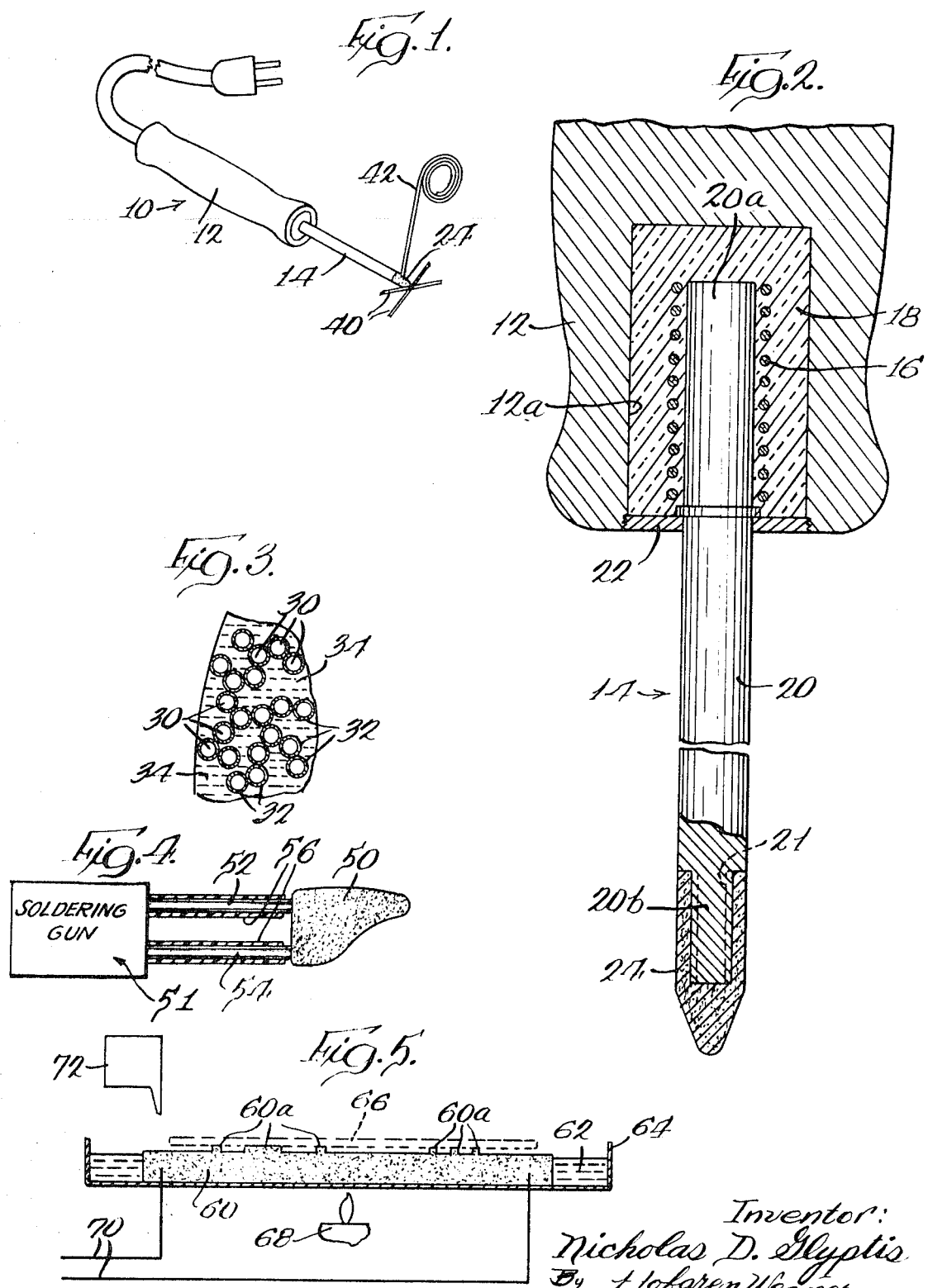

ELECTRIC SOLDERING GUN AND TIP THEREFOR

BACKGROUND OF THE INVENTION

1. Field of the Invention

This invention relates to soldering devices such as soldering irons and soldering guns.

2. Description of the Prior Art

Industrial soldering irons normally have tips of a porous sintered alloy material which is impregnated with a filler. However, such tips have been found to degenerate rapidly under heavy use conditions.

In the use of soldering irons, and particularly industrial soldering irons, it is often desired to solder a connection or the like which is so situated that the solder cannot be introduced directly onto the connection or close to the connection. In such cases, the solder must be applied to the soldering iron tip and flowed along the tip surface to the connection. Often, in moving the iron to insure proper flow to the connection, the connection may be sufficiently disrupted to cause a faulty joint.

Soldering wave devices are used in the manufacture of printed circuit boards. In such devices, a standing wave is maintained in a molten pool of solder and the board to be printed is passed over the pool of solder to receive solder in the proper places. Although such standing wave printing devices are used for commercial production of printed circuit boards they entail very expensive equipment and expense in maintaining such equipment.

SUMMARY OF THE INVENTION

The present invention provides a soldering device such as a soldering iron, soldering gun or solder printing plate which has a solder-delivering element which will stand up under heavy duty operation. The invention further provides a device which includes a flow path through the solder-delivering element so that solder can be flowed more directly to a connection or the like.

The soldering device of this invention includes a soldering element which has a matrix of porous metal with the interstices filled with solder base material. The metal forming the matrix is one which remains solid above the melting point of the solder filling and is highly insoluble in the molten solder filling. The matrix of porous metal has interconnected pores so that the solder base material and matrix both comprise generally continuous phases. In a particularly preferred form, the matrix can be composed of porous bronze, e.g., sintered tin-coated copper spheres.

While this invention is susceptible of embodiment in many different forms, there is shown in the drawings and will be described herein in detail specific embodiments of the invention with the understanding that such description is illustrative and is not intended to limit the spirit and scope of the invention.

BRIEF DESCRIPTION OF THE DRAWINGS

FIG. 1 is a perspective view of a form of soldering iron of this invention in use for soldering a joint;

FIG. 2 is an enlarged fragmentary section of the soldering iron of FIG. 1, showing details of construction at an adjacent tip portion;

FIG. 3 is a schematic illustration of the cross-section of one form of porous metal which can be used in construction of the tip portion of the device shown in FIGS. 1 and 2;

FIG. 4 is an enlarged perspective view of the tip of a soldering gun embodying the porous metal and solder combination shown in detail in FIG. 3; and FIG. 5 shows still another embodiment utilizing the porous material and solder for production of printed circuit boards.

DESCRIPTION OF THE PREFERRED EMBODIMENTS

Turning first to FIG. 1, soldering iron 10 is illustrated having a handle 12 and a tip-supporting rod portion 14. As seen in FIG. 2, the rod portion 14 includes a copper rod 20 having one end 20a received in mica electrical insulation 18 which contains a Nichrome wire heating element in the form of a coil 16 for heating end 20a. Insulation 18 is received in a recess 12a in the end of handle 12 and is held in the recess by a retaining plug 22 which is threaded into the open end of recess 12a. Retaining plug 22 also engages shoulders on copper rod 20 to retain copper rod 20 tightly within insulation 18. Conventionally, keys and keyways can also be used for securing rod 20 to handle 12 in heat receiving association with the heating element 16.

At the other end of rod 20 is a reduced portion which forms a core 20b within a tip element or cap 24. Cap 24 is backed by core portion 20b to a position adjacent the tapered soldering portion of cap 24. The cap 24 is of porous metal and is filled with solder base material, e.g., a solder and flux mixture, to the virtual exclusion of air and other gases, e.g., by vacuum impregnation. Cap 24 can be force fitted over core 20b or can be sintered in place on core 20b.

Turning to FIG. 3, the porous metal of cap 24 can comprise a mass of tin-coated copper balls (60 percent by weight copper balls and 40 percent by weight tin coating) which have been sintered with the tin functioning as a binder. The copper balls are indicated at 30 and the sintered tin coating at 32. The sintered metal forms a continuous phase which preferably has at least about 40 percent, e.g., 40 to 50 percent porosity. The interstices or pores are interconnected generally throughout cap 24. Molten solder is introduced into the interstices under vacuum impregnation conditions to form a generally continuous phase of solder base material filling the voids within cap 24.

In use of the soldering iron, rod 20 is heated and because it is of a material having good heat transmission properties, core portion 20b soon becomes hot and in turn heats the cap 24. During heating the solder base material in cap 24 melts but is held within the interstices of cap 24 by surface tension. The presence of the solder in cap 24 improves the heat conductivity of cap 24 so that cap 24 is more rapidly and evenly heated. This, in addition to the provision of core portion 20b which backs the sleeve portion of cap 24, decreases the temperature drop between end 20a and the tip of cap 24 to the extent that the temperature drop is only about 75° to 100° F. compared with 300° F. in the absence of the core 20b and the solder within cap 24. 75°

After the soldering iron is heated, it can be used in any normal soldering operation. For example, as shown in FIG. 1, the soldering iron can be used to solder a connection of wires 40, using a roll of solder-flux composition 42. Assuming that the wires 40 are not sufficiently accessible to apply both the soldering iron tip and the solder against the connection, the soldering iron alone can be applied against the connection and the solder 42 can be applied to the soldering iron tip 24 at a position spaced from the wires 40. The solder 42 appears to flow into the material of cap 24 displacing solder material within cap 24 onto the connection of wires 40. Thus, the solder-filled tip 24 provides a flow path for delivering solder through the tip to a hard to reach connection. When an amount of solder 42 is supplied to the tip, it has been noted that approximately the same amount leaves the tip and is deposited on the connection.

Another advantage of the solder-filled porous metal tip is its increased life in industrial heavy duty use. Still further improved wear resistance can be achieved by using a porous stainless steel, porous molybdenum or porous tungsten tip filled with the solder material. Such porous materials can be formed either by directly sintering steel or molybdenum particles or by using tin or nickel as a binder. Although stainless steel or molybdenum are not as good heat conductors as copper, the presence of the large amount of solder, e.g., 40 to 50 percent of the tip volume, in the voids of the porous material provides good heat conduction.

Life tests have been run on the above described soldering iron with the iron in actual operation during normal intermittent soldering use. In the life tests it was found that the tip or cap 24 had a life of over 200 hours in actual operation compared with about 80 hours for a conventional tip. In an especially preferred form of the invention, the life of the tip or cap 24 can be markedly further extended by adhering the cap 24 to core portion 20b with heat conductive means, e.g., by soldering or brazing the tip on the core portion 20b using a high melting point solder which does not melt at the use temperature of the soldering iron.

As a more specific example of the especially preferred device, a soldering iron was constructed as described above except that instead of relying on a tight fit of the cap on the core portion the interior of the cap 24 was coated with flux, e.g., borax, core portion 20b was coated with silver braze or solder having a melting point or fusion temperature substantially above that of solder 34 and above the use temperature of the cap 24. The cap was then assembled on core portion 20b and the assembly was heated to solder the cap to the core portion. Suitable high fusion silver brazes or solders such as copper-zinc-silver mixtures are well known and can have fusion temperatures up to 1,000° C. or higher. Normal low temperature solders, e.g., lead-tin solders, forming mass 34 are also well known and and can have fusion temperatures as low as 175°–225° C. or lower.

As another example, a core 20 having a further reduced core portion 20b was used and a tin insert as shown in phantom at 21 in FIG. 2, was coated with silver solder and flux and placed between the cap 24 and core portion 20b during assembly. The tip was then heated to braze the cap, insert and core together as a unit.

Securing the tip to the core with solder or the like apparently prevents formation of oxides at the inner face between the cap and core during use. Formation of oxides reduces heat conductivity so that the heatability of the cap and its performance characteristics as a soldering device tip are reduced with time. The especially preferred embodiment of soldering iron had a use life of over 600 hours.

Still another embodiment of the invention is shown in FIG. 4 in which the sintered spheres 30,32 containing the solder 34 are in the form of a soldering gun tip 50. The gun tip 50 is an electrical conductive heating element supplied with electricity from a soldering gun 51 via conductive supported members 52,54, which can be electrically insulated as at 56 with insulative sleeves. Of course, tip 50 alternatively can be supported on a heat conducting copper rod or the like and supplied with heat from a heating element in the soldering gun handle in a manner similar to that shown in the soldering iron of FIG. 2.

In FIG. 5 the mass of sintered spheres 30,32 and solder 34 is in the form of a printing or stamping block or plate 60 having its printing surfaces defined by upstanding or projecting printing or stamping elements 60a. Stamping plate 60 can be immersed in a bath of molten solder 62 contained in a tray 64 and maintained molten by applied heat as at 68. A circuit board to be printed with solder is shown in phantom at 66 in a print receiving position. Wherever board 66 engages the upper printing surface one of the printing elements 60a, solder is delivered to board 66 by surface tension or wicking action. It will be evident that many circuit boards can be printed by the platen, each receiving solder in the same locations; surface tension maintains an adequate supply of molten solder at the printing surfaces. Thus, the platen is adapted to mass production techniques.

As an alternative embodiment, molten bath 62 and tray 64 can be eliminated, heat can be supplied by delivering a current through conductive plate 60 via power lines 70, and make-up solder can be delivered to plate 60 as needed from a suitable supply of molten solder, such as shown at 72. In this embodiment, the bottom and side walls of block 60 should be closed or contained to prevent undue leakage of solder from block 60, or the illustrated arrangement of bath 62 and tray 64 can be used.

I claim:
1. A soldering device comprising: an electric soldering gun, electrically conductive heating means extending from said gun including a matrix of porous electrically conductive metal with interconnecting pores filled with a generally continuous mass of solder having a melting point below that of the porous metal, said metal matrix being a plurality high melting point spherical metal particles bound together by a binder of sintered lower melting point metal coating on said particles and having an open solder receiving surface and a spaced open solder delivery surface, said porous metal matrix having about a 40–50 percent porosity whereby when solder is melted by said porous metal matrix at the solder receiving surface solder flows from the matrix at the solder delivery surface, and said gun including means for providing an electrical current through the porous metal matrix to heat the solder therein.

2. The soldering device of claim 1 wherein said porous metal comprises porous bronze.

3. The soldering device of claim 2 wherein said porous bronze is sintered tin-coated copper particles.

* * * * *